United States Patent [19]

Vance

[11] 4,212,128

[45] Jul. 15, 1980

[54] ANIMAL TRAP

[76] Inventor: Reginald W. Vance, R.R. 1, Maki Rd., Sault Ste. Marie, Ontario, Canada, P6A 5K6

[21] Appl. No.: 965,609

[22] Filed: Dec. 1, 1978

[51] Int. Cl.² .......................................... A01M 23/30
[52] U.S. Cl. ...................................................... 43/81
[58] Field of Search ...................... 43/81, 81.5, 82, 83, 43/83.5

[56] References Cited

U.S. PATENT DOCUMENTS

| | | | |
|---|---|---|---|
| 1,464,559 | 8/1923 | Britan | 43/81 |
| 1,473,242 | 11/1923 | Marshall | 43/81 |
| 2,175,754 | 10/1939 | Harrison | 43/81 X |
| 2,215,028 | 9/1940 | Booth | 43/83.5 |
| 2,581,628 | 1/1952 | Burwell | 43/81 |
| 3,058,256 | 10/1962 | Wernham | 43/81 |
| 3,394,488 | 7/1968 | Kruger | 43/81 |
| 4,161,080 | 7/1979 | Gabry | 43/82 |

*Primary Examiner*—Nicholas P. Godici
*Attorney, Agent, or Firm*—Hirons, Rogers & Scott

[57] ABSTRACT

An animal trap, especially for lethally catching small rodents such as mice, comprises a generally rectangular base, to which is pivotally mounted a generally U-shaped striker wire, spring urged from a set position to a striking position. A trigger member, of generally S-shape as viewed from the side, is located adjacent one end of the base, and holds the striker wire against the underside of its middle surface to maintain the striker wire in the latched position. An elongated platform is pivotally mounted on the base and is connected at one end to the trigger member. Immediately above the platform is provided a bait receptacle, with an open side presented away from the trigger end of the base, and a pivoted cover or hood which can open and close top access to the bait receptacle, and is elongated and open-ended. The bait in the bait receptacle is thus accessible only to an animal approaching from the striking end of the base, and by the animals stepping on the platform near the striking end. The application of the animal's weight to the end of the platform causes pivoting of the platform, with consequent movement of the trigger member to release the striker wire and spring the trap. The sensitivity of the trap is adjustable by variation of the position of engagement of the striker wire on the trigger member, caused by changing the position of the bait receptacle. The position of the bait receptacle is also adjustable to allow for different animal sizes.

6 Claims, 4 Drawing Figures

U.S. Patent   Jul. 15, 1980   4,212,128
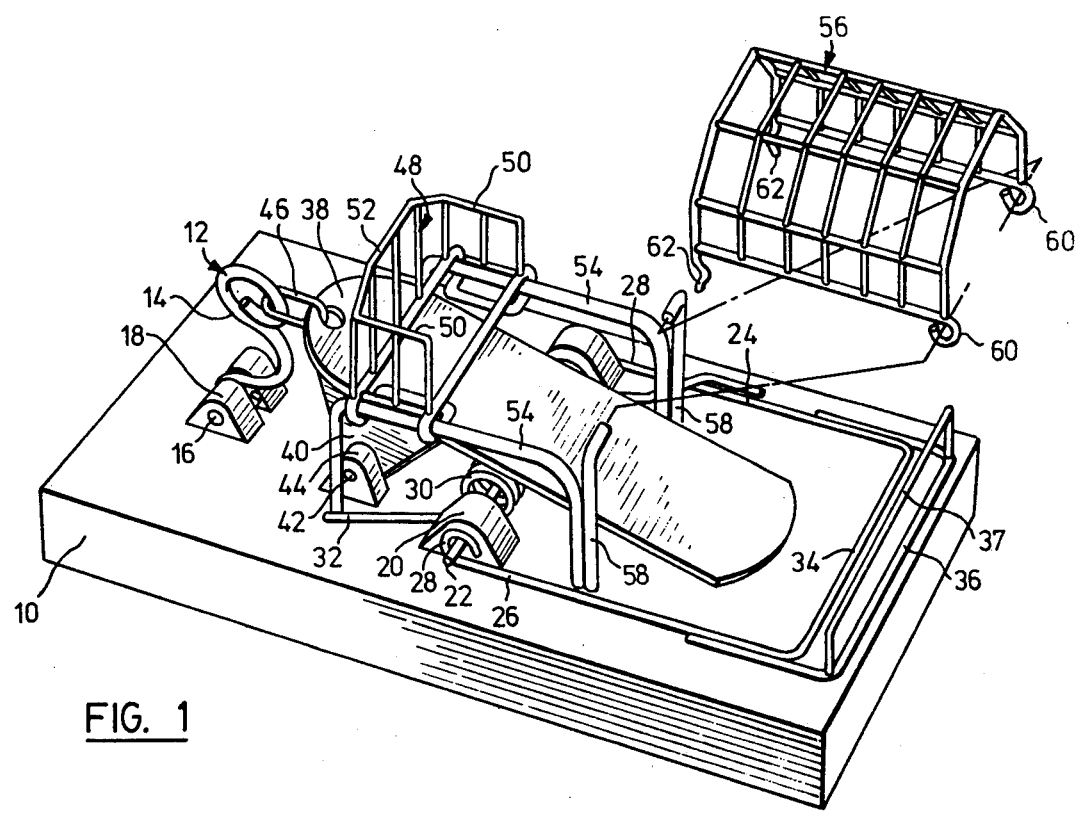
FIG. 1
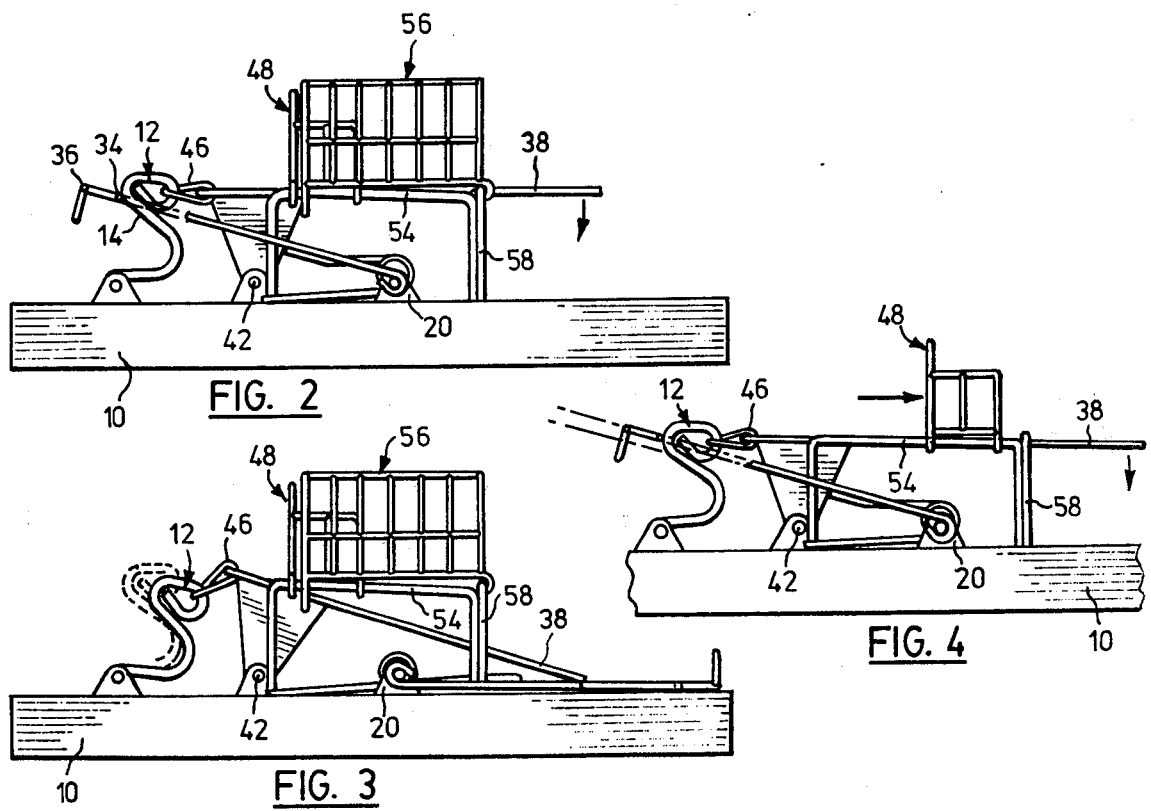
FIG. 2
FIG. 3
FIG. 4

ANIMAL TRAP

BACKGROUND OF THE INVENTION

1. The Field of the Invention

This invention relates to animal traps and more particularly to that class of trap utilized in killing or trapping animals which is mechanically tripped when the animal attempts to obtain bait food placed in the trap.

2. Description of the Prior Art

The prior art abounds with animal traps. U.S. Pat. No. 2,492,957 issued Jan. 3, 1950 to J. N. Blair and U.S. Pat. No. 1,394,649 issued Oct. 25, 1921 to G. H. Thompson both describe animal traps in which a bait receiving portion operates a lever removeably secured thereto. When the lever is operated, it is rotated so as to flail upwardly in the region of the bait and release a spring loaded striker wire, striking the animal which engaged the bait receiving area with sufficient force. Both teachings suffer the common deficiency of having the flailing linkage wire operate in the vicinity of the animal, often times throwing the animal outwardly from the region in which the striker wire will operate. Furthermore, both devices provide for a fixed location for the bait, relative to the linkage wire, thereby requiring an element arm of given magnitude required to trip the mechanism. No adjustment is provided to facilitate tripping for heaver or lighter forces applied to the traps. There has also been proposed by W. T. Oxley a trap of the same general variety as described in the teachings of Thompson and Blair aforementioned, excepting that the bait is located at the end of a spring wire suspended from the base supporting the striker wire and trigger mechanism. The theory of such an apparatus is that an animal, attempting to reach the bait, must necessarily step upon the pedestal used to trip the striker wire, or used to store bait in the Thompson and Blair devices. In point of fact the animals of sufficient size simply to reach over the base portion of the apparatus and successfully obtain the bait without ever releasing the trap into operation.

SUMMARY OF THE INVENTION

It is an object of the present invention to provide an improved, novel animal trap which is effective in trapping animals attempting to reach the bait receiving area thereof.

Rodents, amongst other small animals, often become trap shy after having experienced an attempt to reach the bait of a trap only to hear such trap become triggered and to successfully escape from the trap, with or without nonfatal injury. Accordingly, such "trained" animals become exceedingly difficult to trap on a second encounter with a spring loaded trap. Therefore the present invention is designed to trap an animal efficiently and effectively on its very first encounter with the trap. One of the primary reasons that animals can safely escape with the bait load of a trap is their ability to reach over the trip mechanism and to withdraw the bait without touching a release mechanism, usually associated with the area upon which the bait is placed. Another method for an animal to escape is to have a portion of the trap itself strike the animal in such a way as to cause the animal to be pushed away from portions of the trap intended to capture the animal. Finally, even though animals do step upon trigger mechanisms carrying bait, small animals, of light weight, oftentimes successfully remove the bait since they do not apply sufficient downward force on the trigger mechanism to operate the trap. The present invention recognizes these difficulties and provides a ready solution thereto as well as providing an inexpensively manufactured apparatus which is safe to use, load and clean after use.

Thus, according to the present invention, there is provided an animal trap comprising:

a base;

a platform pivotally mounted in said base;

a trigger member movably mounted on said base and coupled to said platform;

a generally U-shaped striker wire pivotally secured to said base and pivotally movable between a set position and an opposed striking position;

spring means biasing said striker wire towards its striking position;

the trigger member being movable, in response to movements of said platform, between a first, set position in which it engages the striker wire to hold said striker wire in the set position, and a second, releasing position in which it releases the striker wire;

a bait receptacle mounted above said platform and presenting one open side in a direction away from the trigger member and towards the striking position of the striker wire, so as to allow access to bait in said bait receptacle from one lateral direction only;

a cover for said bait receptacle, said cover having an open side coinciding with the open side of said bait receptacle, and being movable between a covering position closing top access to the bait receptacle, and an open position permitting top access thereto for bait loading purposes.

BRIEF DESCRIPTION OF THE DRAWINGS

FIG. 1 is a perspective view of the specific preferred embodiment of the present invention;

FIG. 2 is a side elevation, partly in section, of the device of FIG. 1, the trap being in its set position;

FIG. 3 is a view similar to FIG. 2 but with the trap in its released, striking position;

FIG. 4 is a view similar to FIG. 2, but with the bait receptacle at a differently adjusted location.

DESCRIPTION OF THE PREFERRED EMBODIMENTS

The provision of the bait receptacle and hood therefor ensure that the animal can only obtain the bait by approaching from the correct, predetermined direction, thereby ensuring that the animal steps on the platform and triggers the trap in doing so. Moreover, this arrangement ensures that the animal will be correctly positioned, when triggering the trap, to receive a fatal blow from the striker, as opposed to a nonfatal blow or merely being thrown away from the trap.

Preferably, the trigger member is a wire pivotally secured to the base adjacent one end of said base, the trigger wire being located inside the arc of travel of the striker wire, the trigger wire being generally S-shaped as viewed in side elevation, the curved-horizontal intermediate portion thereof being adapted to engage the base of the U-shaped striker wire when in the set position. The sensitivity of the trap to triggering by animals of different weight can thus be arranged on setting the trap, by adjusting the position of the base of the U-shaped striker, in the set position, along the curved-horizontal intermediate portion of the S-shaped trigger.

The structure and method of fabrication of the present invention is applicable to a base, preferably fabricated from a plastic material, such as polypropylene, having a generally rectangular shape, optionally supported by downwardly protruding legs. In the preferred embodiment, the platform also has a generally rectangular shape, but of somewhat smaller dimensions than the base, and elongated. A pair of downwardly turned lips on the platform are provided, each having a hole therethrough to allow pivoted connection to a pair of upstanding plates on the base. The U-shaped striker wire, having the ends thereof secured to a pivot rod, is pivotably secured to the base plate by having the ends of the pivot rod pass through another pair of opposed aligned holes in formations on the base plate. Wrapped about the pivot rod and affixed to the striker wire are one or more springs, one end of each of which rests upon the uppermost lateral surface of the plate, and the other end of each of which is in touching engagement with the legs of the U-shaped striker wire so as to cause the striker wire to be urged towards one end of the base. Affixed to one end of the platform is a link member, which connects to the trigger member. The trigger member, being fabricated in the form of a wire, may be pivotally mounted between brackets on the base.

When it is desired to load the trap, the striker wire is moved to its set position and the trigger member is pulled rearwardly to engage the intermediate surface portion thereof with the striker wire. The platform is thus raised to engage the underside of the bait receptacle. The hood can now be moved to the open position and the bait put into the receptacle and the hood closed, without touching the platform to risk triggering the trap. Any downward force applied to a side of the platform located opposite of the side thereof carrying the link member, of sufficient force, causes the trigger wire to release the striker wire, releasing same for rotational translation about the pivot rod passing through the plates of the base. Thus, it can be seen that there are no mechanisms carried above the uppermost lateral surface of the trap, which may strike the animal as the striker wire is placed into motion, tending to push such animal outwardly from the arcuate path of the striker wire, before the striker wire engages the animal in a trapped position. Furthermore, it may be seen that the broad lateral surface of the platform constitutes a cantilevered arm of considerable length, extending outwardly from and normally to the longitudinal axis of the pivot rod carrying the bait tray in pivotal relationship to the base.

DETAILED DESCRIPTION OF THE SPECIFIC PREFERRED EMBODIMENTS

The trap according to the invention comprises a generally rectangular base 10, to the upper surface of which the various operative parts of the trap are mounted. Thus, near one end, there is mounted a trigger member 12 in the form of a generally S-shaped wire, having an intermediate curved-horizontal portion 14. The trigger member 12 is pivotally mounted to the base 10 by means of a pivot rod 16 extending between a pair of upstanding end brackets 18 and through a lower aperture in the trigger member 12.

Near the centre of the base 10 there are provided a pair of central brackets 20 through which passes pivotally a centre pivot rod 22. A generally U-shaped striker wire 24 is provided, the legs 26, 28 of which are bent rearwardly to provide pivot mounting formations embracing the centre pivot rod 22. A coil spring 30 surrounds the centre pivot rod 22, one end of which 32 bears against the upper surface of the base 10, and the other end of which bears against the leg 28 of the striker wire 24, so as to spring urge the striker wire 24 to the striking position shown in FIG. 1. The base of the striker wire 24 comprises two joined parallel base members 34, 36, enlarging the striking area of the striker wire 24. Either or both of the base members 34, 36 thereof may be plastic coated. A perpendicular extension 37 protrudes from base member 36, to facilitate lifting of the striker wire.

A platform 38 is provided, pivotally mounted on the base 10 by means of depending brackets 40 secured to the platform 38, and pivot rod 42 extending transversely across the base 10 between mounting blocks 44. The platform 38 is elongated and arranged in cantilever fashion above the coil spring 30 and within the U-shape of the striker wire 24. At its end adjacent to the trigger member 12, the platform 38 is connected thereto by a link 46 received in the upper part of the trigger member 12. Thus, as shown in FIG. 2, when the platform 38 is depressed to pivot downwardly, in a clockwise direction about pivot rod 42, link 46 operates to pull trigger member 12 to the right, as shown in the drawings.

A bait receptacle in the form of a wire mesh bait pan 48 is located above the top surface of the platform 38. When the platform 38 is raised from its position shown in FIG. 1 to its position shown in FIG. 2, the upper surface of the platform 38 bears against the lower surface of the bait pan 48. As shown, the bait pan 48 has side pieces 50 and a rear piece 52, so that access to bait received in the bait pan 48 is available only from one side, along the length of the lever 38. The bait pan 48 is slidably mounted on a pair of upstanding U-shaped rails 54, protruding upwardly from the top surface of the base 10. Thus the bait pan 48 can be moved forwardly and rearwardly with respect to the trigger member 12, along the rails 54. By so doing, the vertical position of the platform 38 is varied, when the trap is in its set position with the platform raised, as shown in FIGS. 2 and 4, with different portions of the upper surface of the platform 38 coming into engagement with the underside of the bait pan 48, thus to vary its vertical disposition, and thus to change the angular position of the trigger member 12.

A cage or hood 56 is provided, of wire mesh form to overlie the top of the bait pan 48 and prevent top access thereto. The wire hood 56 is pivotally mounted on angle rods 58 extending upwardly from the top surface of the base 10 and pivotally received at their ends in depending hook formations 60 at one end of the hood 56. At its forward end, the wire hood 56 has depending spring legs 62, which will engage inside rails 54 when the wire hood 56 is pivoted to its downward location. When in its down location, the hood 56 embraces and covers the bait pan 48, preventing top access thereto, but allowing access from one end, along the platform 34, through the length of the hood 56.

The operation of the trap will now be clear, from the above description. To set the trap, the striker wire 24 is moved from its position shown in FIG. 1, pivoting about centre pivot rod 22 against the urging of spring 30 to be located under trigger member 12, with the base member 34 of the U-shaped striker rod engaging against intermediate portion surface 14. For this to happen, the platform 38 is raised, to a position limited by the adjusted position of the bait pan 48, so as to permit sufficient rearward movement of trigger member 12 to engage the base 34 of the striker wire 24. The hood 56 may be pivoted to open access to the top of the bait pan 48, for loading of bait therein, and the hood may then be replaced to prevent such top access, with the spring legs 62 engaged inside rails 54. A small animal cannot therefore remove the hood to gain access to the bait from the top of the pan, whilst at the same time loading of the trap with bait can be accomplished in the set position without substantial risk of triggering the trap. In order to obtain the bait, an animal is obliged to approach the bait pan 48 through the length of the hood 56, and thereby step upon the end of the platform 38, to trigger the trap whilst the animal is in the lethal blow striking position. As downward force is applied to the end of the platform 38, as shown in FIG. 2, causing it to rotate in the clockwise direction, trigger member 12 is pulled to the right by means of link 46, so that eventually base member 34 of striker wire 24 comes out of engagement with intermediate surface portion 14 of the trigger member 12, and the striker wire is forced to the position shown in FIG. 1 and FIG. 3, by the coil spring 30.

Adjustment of the sensitivity of the trap is accomplished by manual arrangement of the engagement of the base member 34 of the striker wire 24 at the appropriate position on intermediate portion surface 14 of the trigger. The form of link 46 permits a degree of lost motion between the platform and the trigger, so as to set the trap in a more sensitive operating position. Similarly, the trap is set for operation by animals of different weights, by adjustment of the bait pan 48 along the rails 54 to vary the vertical position of the platform 38, and thereby vary the set position of the trigger member 12 with respect to the striker wire base 34.

One of the advantages of the present invention is an animal trap which is totally effective in trapping animals attempting to reach the hooded bait receiving area thereof.

Another advantage of the present invention is an animal trap which permits variable amounts of tripping forces to operate the release mechanism of the trap, thereby accommodating to animals of different weights and sizes.

Still another advantage of the present invention is a shrouded bait area tending to force the animal to approach such shrouded bait containing area in a preferred direction, tending to place the animal in a position so as to be struck by the striker wire when released.

Yet another advantage of the present invention is an animal trap which may be safely loaded and unloaded with great ease.

A further advantage of the present invention is an animal trap which may be conveniently and easily cleaned after use.

Another advantage of the present invention is an animal trap having a broadened area with which to strike the animal after the trap has been released by such animal attempting to reach the baited portion thereof.

Still another advantage of the present invention is an inexpensively fabricated, durably constructed and reliable animal trap useful in trapping animals of various sizes.

Thus, there is disclosed in the above description and in the drawings, an embodiment of the invention which accomplishes the objects thereof. However, it will become apparent to those skilled in the art, how to make variations and modifications to the instant invention. Therefore this invention is to be limited, not by the specific disclosure herein, but only by the appending claims.

I claim:

1. An animal trap comprising:
    a base;
    a platform pivotally mounted in said base;
    a trigger member movably mounted on said base and coupled to said platform;
    a generally U-shaped striker wire pivotally secured to said base and pivotally movable between a set position and an opposed striking position;
    spring means baising said striker wire towards its striking position;
    the trigger member being movable, in response to movements of said platform, between a first, set position in which it engages the striker wire to hold said striker wire in the set position, and a second, releasing position in which it releases the striker wire;
    a bait receptacle mounted above said platform and presenting one open side in a direction away from the trigger member and towards the striking position of the striker wire, so as to allow access to bait in said bait receptacle from one lateral direction only, said bait receptacle being positionally adjustable twards and away from the trigger member relative to the platform;
    a cover for said bait receptacle, said cover having an open side coinciding with the open side of the bait receptacle and being movable between a covering position in which it is above the bait receptacle, and an open position permitting top access thereto for bait loading purposes;
    and means for releasably holding said cover in its covering position.

2. The trap of claim 1 wherein the trigger member is a wire pivotally secured to the base adjacent one end of said base, said trigger wire being located inside the arc of travel of the striker wire, the trigger wire being generally S-shaped as viewed in side elevation, the curved-horizontal intermediate portion thereof being adapted to engage the base of the U-shaped striker wire when in the set position.

3. The trap of claim 2 wherein the striker wire has an additional base portion extending parallel to the base of the U-shape thereof.

4. The trap of claim 3 wherein at least one of the base portions of the striker wire is covered with a plastic material.

5. The trap of claim 1 wherein the platform, in the set position, bears against the underside of the bait receptacle, downward pivoting movement of the platform causing movement of the trigger member to the releasing position thereof.

6. The trap of claim 5 wherein adjustment of the position of the bait receptacle causes adjustment in the vertical position of the platform, thereby adjusting sensitivity of the trap to springing to its striking position on application of downward force to said platform.

* * * * *